Aug. 13, 1935.                C. A. CAMPBELL                2,010,914
                                 AIR BRAKE
                            Filed July 27, 1932            2 Sheets-Sheet 1
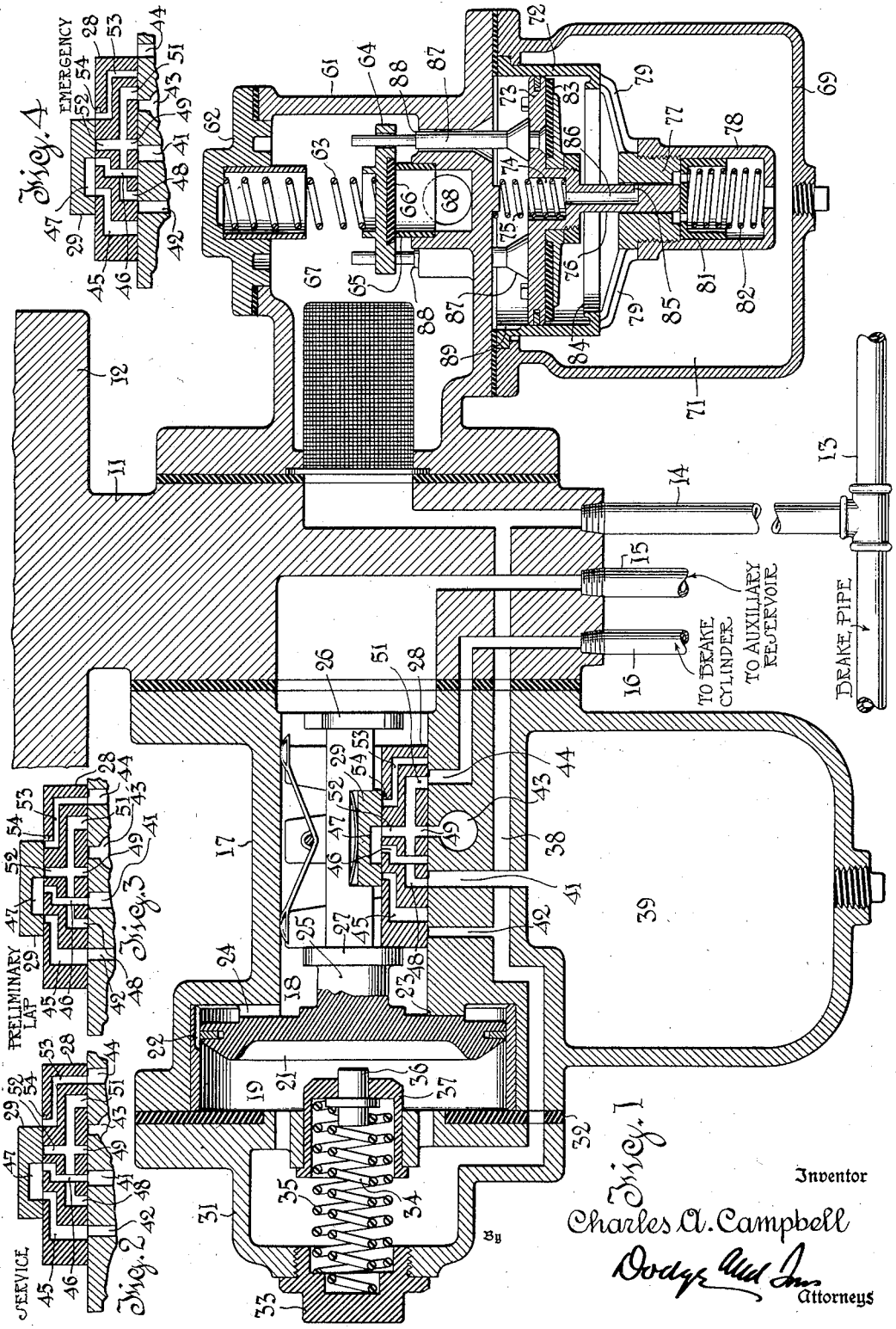
Inventor
Charles A. Campbell
Attorneys Aug. 13, 1935.  C. A. CAMPBELL  2,010,914
AIR BRAKE
Filed July 27, 1932   2 Sheets-Sheet 2
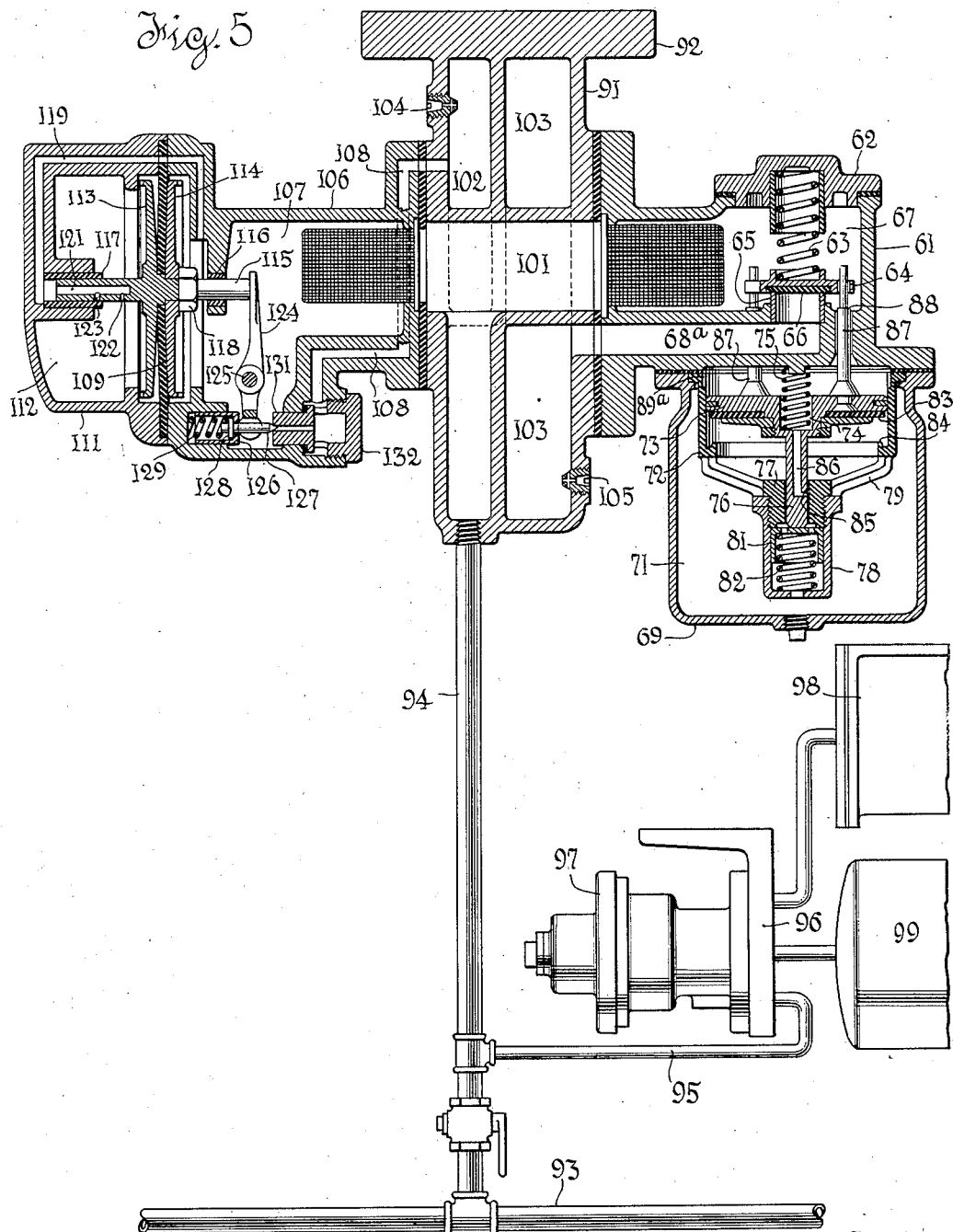
Inventor
Charles A. Campbell
By
Attorneys Patented Aug. 13, 1935

2,010,914

UNITED STATES PATENT OFFICE 2,010,914

AIR BRAKE

Charles A. Campbell, Watertown, N. Y., assignor to The New York Air Brake Company, a corporation of New Jersey Application July 27, 1932, Serial No. 625,098

22 Claims. (Cl. 303—82)

This invention relates to air brakes, and particularly to means for venting the brake pipe in service and in emergency and for preserving such a definite distinction between the two types of venting that an application which is initiated by a service reduction shall never degenerate into an emergency application. Another and related feature of the invention is stabilization of the emergency valve against functioning as the result of overcharging of the balancing chamber.

The increasing length of trains has led to a demand for more rapid propagation of service applications. This entails sharper and more intense service venting with an increased tendency toward undesired emergency applications.

The invention is applicable with any quick service venting mechanism in which a substantially uniform amount of air is discharged from the brake pipe in each quick service function. A separate emergency vent valve is used and is of that well known type in which the emergency piston is interposed between the brake pipe and a balancing chamber. As heretofore, the emergency piston controls the charging of the balancing chamber from the brake pipe under running conditions and controls the bleeding of the balancing chamber to the brake pipe at a service rate when the piston moves under a service reduction of brake pipe pressure to a service position in which it is ready to actuate but does not actuate the emergency vent valve. Where local quick service venting is not intense this bleeding flow from the balancing chamber is sufficient to arrest the emergency piston in service position before it acts to open the emergency vent valve, but it has been found insufficient where intense service venting is used.

The present invention contemplates increasing the lost motion travel of the emergency piston from running position to the position which it assumes in service so that the pressure in the balancing chamber will be reduced quite substantially by such motion.

Assuming that quick service venting does reduce brake pipe pressure a definite amount, the displacement of the emergency piston in moving from running to service positions is so coordinated with the volume of the balancing chamber that balancing chamber pressure drops to an equality or substantial equality with brake pipe pressure. The relation need not be precise, but the effect is to dissipate by expansion in the balancing chamber, pressure which might force the emergency piston far enough to open the emergency vent valve. Where a measuring chamber is used with the quick service valve, the invention contemplates coordination of the volumes of the measuring chamber, the volume of the brake pipe on the corresponding car, the volume of the balancing chamber, and the emergency piston displacement in moving idly from emergency to service position.

Various quick service mechanisms are known, some of which are independent of the triple valve, and others of which form a component part of the triple valve. Either type may be used. While I prefer to make use of a measuring chamber to control the service venting, because of its more precise action, control of service venting may be secured by other means, and if effective, will suffice for embodiment according to the invention.

The invention attains its greatest usefulness in connection with a quick service venting mechanism of the so-called repeater type, i. e., one which vents the brake pipe on each successive reduction of brake pipe pressure in a split reduction application, but it may be used with quick service mechanisms of the non-repeating type. Where a measuring chamber is used, the distinction between the two types turns on whether the chamber is vented in lap position (repeating type) or is not vented until the valve moves to release position (non-repeating type). By giving the emergency piston a substantial false motion to a release position from normal running position an overcharge of the balancing chamber built up in release may be dissipated when the piston returns to running position.

While the invention is applicable with many elaborate forms of triple valve having such well known characteristics as restricted release and recharge, and the control of the development of brake cylinder pressure in service or in emergency, or both, these functions are not involved in the venting of the brake pipe either in service or in emergency and accordingly, in the interest of a simple explanation, I shall describe the invention as applied to a very simple form of triple valve having a quick service measuring chamber with means to vent the chamber during release. As a modification I shall show the use of two vent valves, one for service and the other for emergency venting, each independent of the triple valve.

In the drawings:—

Fig. 1 is a vertical axial section through a quick service triple valve and an emergency vent valve, coordinated according to the present invention. The triple valve is in release and recharge position and the emergency valve is in running position.

Fig. 2 is a fragmentary view showing the triple slide valve and graduating valve in service position.

Fig. 3 is a similar view showing preliminary lap position.

Fig. 4 is a similar view showing emergency position.

Fig. 5 is a view illustrating a modified arrangement in which a brake pipe, plain triple valve, auxiliary reservoir and brake cylinder (all shown in elevation) are connected with a quick service vent valve and an emergency vent valve (both shown in vertical axial section) the two vent valves being coordinated according to the present invention.

In the drawings 11 represents the bracket having a mounting flange 12. The brake pipe is shown at 13 and is connected to a branch pipe 14 which is connected with the bracket 11. An auxiliary reservoir (not shown) is connected to the bracket by the pipe 15, and the brake cylinder (not shown) is connected with the bracket by pipe 16. The bracket 11 is formed with two mounting faces against one of which is bolted the body 17 of the triple valve. This triple valve has a slide valve chamber 18 and a cylinder 19 for the triple piston 21. The triple piston controls charging flow through the charging groove 22. In release position it seats against the flange 23 at the outer end of the slide valve chamber 18, charging flow occurring through slot 24.

The piston 21 has a stem 25 which is guided at its inner end by a spider 26. The stem 25 also has a collar 27 and between the collar 27 and spider 26 a slide valve 28 is confined, but is permitted a limited amount of lost motion. The valve 28 coacts with a seat formed in the lower part of the valve chamber 18. There is a graduating valve 29 mounted on a seat on the upper face of the valve 28, the valve 29 being closely confined in a notch in the stem 25. It thus moves with the piston 21 and is moved relatively to the valve 28 as a result of the lost motion permitted the latter.

The valves 28 and 29 are held to their seats by the usual bow-springs which are indicated in the drawings. The front cap 31 is of familiar form and is sealed to the body 17 by means of a gasket 32 which also serves as a seat for the rim of the piston 21 in the emergency position of the latter. A threaded plug 33 serves as a seat for the graduating springs 34 and 35 which position graduating stops 36 and 37 designed to coact serially with the piston 21, the stop 36 being slidable in the stop 37.

The branch pipe 14 leading from the brake pipe communicates by way of passage 38 with the space to the left of piston 21. Formed in the lower part of the body 17 is a chamber 39 which is the quick service measuring chamber. A port 41, called the quick service chamber port, is formed in the seat for the slide valve 18. A quick service brake pipe port 42 is also formed in this seat, as are the exhaust port 43 and the brake cylinder port 44. The port 43 leads to atmosphere, and may be controlled by a retainer, as usual, if desired. The port 44 communicates with the brake cylinder pipe 16.

There are two ports 45 and 46 which lead through the slide valve 28 from top to bottom. In service position these two ports register with the ports 42 and 41 and at such time are connected by the recess 47 in the graduating valve 29. There are three ports in the lower face of the slide valve 28, namely, 48, 49 and 51. These are connected together and are also connected to a port 52 which leads to the upper face of the valve. In release position port 48 registers with 41 and port 51 registers with port 44, while the port 49 registers with the exhaust port 43. Consequently in release position the measuring chamber 39 and the brake cylinder are both exhausted.

There is a port 53 which extends through the slide valve 28 from top to bottom. In service position this registers with the brake cylinder port 44. Its upper end has a restricted extension 54 and is controlled by the graduating valve 29. Consequently when the graduating valve moves to the right from service position spring 34 assists until valve 29 laps the upper end of the port 53 but does not terminate service flow since extension 54 is still open. Gradual fall of auxiliary reservoir pressure causes the final lapping motion. In service position the port 48 is moved out of register with port 41 and port 51 is moved out of register with port 44. In service position the port 46 registers with port 41 and port 45 registers with port 42. Ports 45 and 46 are connected at such time by cavity 47 causing quick service flow to chamber 39.

The novel features of the triple valve above described form the subject matter of my prior application, Ser. No. 593,635, filed Feb. 17, 1932, and hence these features are not claimed in the present application.

Mounted against the second mounting face described as formed on bracket 11, is the upper case 61 of the emergency vent valve. This is open at the top, the opening being closed by cap 62 which serves as a spring seat for the emergency vent valve spring 63. The spring 63 reacts downward against the emergency vent valve 64 which is of ordinary form and closes against a seat 65 with which it seals by means of an inserted face 66 of rubber or other suitable material.

The chamber 67 within the body 61 is in direct communication with the brake pipe by means of a branch passage leading from pipe 14 through the bracket 11. Flow through the seat 65 passes to atmosphere through a vent passage 68. The cap 62 is sealed to body 61 by means of a gasket and the body 61 like the body 17, makes a tight joint with its mounting face on the bracket 11 by means of an appropriate ported gasket.

Suspended beneath the body 61 is a cup-like shell 69 which encloses the balancing chamber 71 and has removably mounted within its upper margin a bushing 72 for the emergency piston 73. The shell 69 and bushing 72 seal to the body 61 by means of a gasket as shown. Piston 73 has a cup-like depression 74 at the center of its upper face and mounted in this is a coil compression spring 75, the upper end of which is centered by a stud formed on the lower face of the body 44 as shown.

Projecting downward from the piston 73 is a guide stem 76. This works loosely in a guideway formed in bushing 77 which is threaded into the cup-like hub 78 suspended from cylinder bushing 72 by arms 79. Guided in hub 78 is a sliding stop 81 urged to its upper limit of motion by spring 82. In its normal position stop 81 arrests piston 73 in its normal or running position. If it yields under high releasing pressure piston 73 may move down until its gasket 83 seats on rim 84 formed in cylinder bushing 72. In this position, called release position, charging flow is limited strictly to the capacity of side port 85 leading from the bore 86 in stem 76 and the clearance between stem 76 and guide bushing 77.

The piston 73 carries a plurality of upstanding thrust pins 87, two of which appear in the drawings, which pass through a passage of substantially greater diameter formed in the body 61, and have reduced portions passing through valve 64 and having shoulders 88 in position to strike the valve and unseat it after limited upward travel of the piston. The passages around the stems 87 provide for direct communication between the chamber 67, which is the brake pipe chamber, and the space above the piston 73.

The balancing chamber 71 is charged by flow through these passages, thence through passage 86 and lateral passage 85 and through the clearance in the guideway to the chamber 71. When brake pipe pressure is reduced at a service rate, the piston moves up until the shoulders 88 on pins 87 engage the valve 64 without opening the valve. This is called service position.

The novel mechanical features of the vent valve above described form the subject matter of my prior application Ser. No. 563,619, filed September 18, 1931, and hence are not claimed in the present application.

The motion of the piston 73 from running position, shown in the drawings to service position in which the shoulders 88 engage valve 64 without unseating the valve, is somewhat greater than is customary, and according to the invention the displacement of piston 73 in the idle motion just described, is so coordinated to the total volume of chamber 71 that such upward motion of the piston will reduce the pressure in chamber 71 by substantially the same amount that brake pipe pressure is reduced by connection of the brake pipe with the chamber 39. This coordination can be readily carried out for the reason that the brake pipe has a definite volume on each car and the measuring chamber 39 on that car can be made to correspond.

In emergency valves of the type here described, as heretofore constructed, back flow through the port 85 and passage 86 at a rate controlled by the size of the port 85, was relied upon to dissipate pressure from the chamber 71 and prevent the piston from unseating the emergency valve. That action is present in the valve here described, but is supplemented by the marked depletion of pressure in the balancing chamber 71 which arises from the lost motion travel of the piston 73.

The piston 73 will move from normal or running position to the so-called release or lowermost position only in response to an excessive releasing pressure in the brake pipe, such as occurs at the head end of trains. In such release position the sealing of gasket 83 resists overcharge but does not prevent it. The travel between release and running positions is made longer than usual and is so coordinated with the area of the piston and the volume of chamber 71 that motion back to running position will dissipate the overcharge in 71 by expansion. Hence undesired emergency action as the result of overcharges is avoided.

The function of spring 75 is to ensure that the piston moves from service to running position. Omission of the spring is possible. The groove 89 may be used if desired to ensure closing of valve 64 before the brake pipe is completely exhausted.

Piston 73 opens port 89 in emergency position and vents chamber 71 at a moderately rapid rate.

Operation of Form Shown in Figs. 1-4

Running conditions

In running conditions the triple valve moves to the release position shown. The auxiliary reservoir is charged in the usual manner. The brake cylinders are exhausted to atmosphere and the measuring chamber 39 is exhausted to atmosphere. The balancing chamber 71 is charged.

Service position

Upon a service reduction of brake pipe pressure, the piston 21 moves outward to quick service position. So far as quick service venting is concerned it suffices to say that the brake pipe is connected to the chamber 39 so that pressures in the chamber and brake pipe equalize producing a definite reduction of brake pipe pressure. In response to this reduction, the piston 73 moves upward until it engages the valve 64 without opening the latter. Because of the coordination of volumes, already described, the pressure urging piston 73 upward is reduced at this point to substantial equality with reduced brake pipe pressure. Consequently there is no tendency for the emergency piston to overtravel and cause an undesired emergency application.

Service lap position

When auxiliary reservoir pressure is lowered by flow to the brake cylinder to slightly beyond equalization with the reduced brake pipe pressure, the triple valve will move back to lap position, disconnecting the measuring chamber 39 from the brake pipe. Flow through the passage 86 and port 85 will dissipate the slight differential existing between brake pipe pressure and the pressure in the balancing chamber 71 (such differential being incident to the presence of the spring 75 if used) whereupon the spring 75 will restore the piston 73 to running position. Under these conditions brake pipe pressure and pressure in the chamber 54 are again equal. A second reduction of brake pipe pressure will repeat the functions already described.

Emergency

On an emergency application a rapid reduction of brake pipe pressure causes the piston 73 to move upward to its limit of motion, unseating the valve 64 and venting air from the brake pipe directly to atmosphere.

General considerations

It is not strictly necessary to use the spring 75, and ordinarily this spring would be light. When the spring is present, the pressure in chamber 71, when the piston first arrives in service position, is necessarily slightly higher than it is when the spring is omitted, but the principle is the same in both cases. In fact, it is not necessary that the coordination of brake pipe volume, quick service measuring chamber volume, balancing chamber volume, and emergency piston displacement, be precise. It is possible by coordination of these volumes, according to the principles above set forth, so to stabilize the emergency valve that it will not respond to a service reduction of brake pipe pressure even though the local service venting be quite pronounced and sudden. The suddenness of the service venting is highly important to rapid propagation and heretofore sudden venting was extremely likely to cause a sensitive emergency valve to move to emergency position because it allowed no adequate time for back flow to occur through the ports 85 and 86. According to the present invention this back flow is not essential to dissipate the pressure which forces the emergency piston 73 from running to service position and which if not dissipated would cause this piston to continue to emergency position. The motion of the piston itself effects the desired result, and then equalizing flow through ports 85 and 86 modified by the action of the spring 75 (if used), restores the emergency valve to running condition ready to repeat the function just described, or to move to emergency position upon an ensuing reduction of brake pipe pressure. A similar result is secured when piston 73 moves from release to running position. The effect is to permit the use of extremely sensitive valves with no danger of accidental functioning under conditions which would cause prior valves to function falsely.

The particular type of triple valve with which the arrangement is used is immaterial. The quick service vent may or may not be embodied as a component part of the triple valve. To illustrate this possibility as well as other optional features, Fig. 5 has been included in the present disclosure.

Referring to Fig. 5, 91 represents a mounting bracket with supporting flange 92, to this is connected a branch 94 from the brake pipe 93. From branch 94 a pipe 95 leads to bracket 96 on which is mounted a triple valve 97 of the pipeless type. A brake cylinder 98 and auxiliary reservoir 99 are piped to bracket 96 which establishes proper connections between triple valve, brake pipe, brake cylinder and auxiliary reservoir. The triple valve 97 has no service or emergency venting functions but merely controls admission and exhaust of air to and from the brake cylinder and the charging of the reservoir (of which one or more may be used as is well known in the art).

The bracket 91 is formed with a cross passage 101 with which brake pipe branch 94 communicates. Passage 101 terminates in two opposed mounting faces, one for a quick service vent valve and the other for an emergency vent valve. Formed in bracket 91 is a small measuring chamber 102 for the quick service vent valve and a large measuring chamber 103 for the emergency vent valve. These are isolated from each other and from passage 101. Each has a restricted vent to atmosphere, chamber 102 through an interchangeable choke 104 and chamber 103 through an interchangeable choke 105.

The emergency vent valve is identical with that already described with one exception. The passage 68a leads to chamber 103, unlike passage 68 of Fig. 1 which leads to atmosphere. This is the sole difference. Identical parts are indicated by the same numerals 61 to 67 inclusive and 69 to 89 inclusive (used on Fig. 1). Chamber 87 communicates directly with brake pipe passage 101.

Functionally a slight difference is introduced by the use of chamber 103 and choke 105. Groove 89 is of such capacity that pressure in chamber 71 falls in emergency at a rate slower than the fall of brake pipe pressure caused by initial flow to chamber 103, but faster than brake pipe pressure is lowered by flow through choke 105 after chamber 103 is charged. Hence emergency venting is limited to little more than the capacity of chamber 103.

The quick service vent valve is provided with a body 106 having a chamber 107 in direct communication with brake pipe passage 101 and a vent passage 108 in direct communication with quick service chamber 102.

The outer end of body 106 is apertured to receive a flexible diaphragm 109, which is clamped at its margin by a cap 111. This encloses a chamber 112 to the left of the diaphragm 109. The diaphragm 109 is clamped at its center between two convex discs 113 and 114, the first of which is integral with a stem 115. Stem 115 is guided at 116 in body 106 and in sleeve 117 in cap 111. A nut 118 threaded on the stem clamps the discs together. The margins of the discs serve as limit stops in conjunction with portions of housing 106 and cap 111, and are notched to assure free air flow.

The chamber 112 is charged from the chamber 107 through a port 119 which leads to the end of guide sleeve 117. The stem 115 is bored from its outer (left) end at 121, and from bore 121 lead two lateral ports, a small one 122 which is always open to chamber 112 and a larger one 123 which is blanked by sleeve 117 when diaphragm 109 is in its outer (left hand) position, and which is exposed when the diaphragm is in its inner position.

Thus chamber 112 which is a balancing chamber or reservoir is charged from the brake pipe at a rate determined by the flow capacity of port 122, and discharges back to the brake pipe, when brake pipe pressure is reduced, at a rate fixed by the combined flow capacity of ports 122 and 123.

The end of stem 115 is in thrust relation with one end of lever 124 which is fulcrumed at 125. The other end of lever 124 is forked and is in thrust relation with cup 126 which in turn encircles pin valve 127 and is in thrust relation with collar 128 thereon, so as to be capable of drawing the valve open. The cup 126 is slidably guided in body 106. A coil compression spring 129 reacts against collar 128 and urges valve 127 closed.

The valve 127 coacts with a seat bushing 131 sealed in body 106 by threaded plug 132 and controlling flow from chamber 107 to port 108 and chamber 102.

OPERATION OF FORM SHOWN IN FIG. 5

The functions of the emergency vent valve have been already described.

During release, the chamber 112 is charged as explained, the charging rate being limited to the capacity of port 122.

On occurrence of a service reduction of brake pipe pressure diaphragm 109 moves to the right unseating valve 127 and exposing port 123. Valve 127 has a capacity in excess of choke 104, so brake pipe pressure is reduced rapidly by flow to chamber 102, and then slowly at a rate determined by choke 104. Since the flow capacity of choke 104 is less than the combined flow capacity of ports 122 and 123 pressure in chamber 112 falls faster than brake pipe pressure once chamber 102 is charged. Hence valve 127 closes. Then choke 104 dissipates the charge in chamber 102.

Thus the service vent mechanism is conditioned to repeat its venting function upon the next service reduction of brake pipe pressure.

The pressure drop produced by venting into chamber 102 causes piston 73 of the emergency valve to move from running to service position and such motion produces a similar reduction of pressure in chamber 71, so that piston 73 will not be moved beyond service position by quick service venting.

The adaptability of the invention to two different types of quick service mechanism has been illustrated, any that gives a measured discharge might be used. One of the illustrated quick service mechanisms is of the repeating type. The other might readily be, since triple valves of the repeating quick service type are known. The emergency valve has been shown as dissipating pressure in the chamber 11 by two functionally different motions. Either of these features may be used independently of the other. In the claims the term "piston" is used in a generic and not in a limiting sense.

What is claimed is,—

1. The combination of a brake pipe; a quick service vent valve having a measuring chamber into which brake pipe air is discharged; and an emergency valve comprising a balancing chamber and a vent valve actuating piston mounted between said balancing chamber and the brake pipe, said piston being afforded a definite amount of lost motion from its normal running position before it opens the emergency vent valve, the volume of the quick service measuring chamber being so coordinated with the brake pipe volume and the displacement of the emergency piston in its lost motion travel being so coordinated with the balancing chamber volume, that the reduction of brake pipe pressure produced by equalization with the measuring chamber is substantially equal to the reduction of pressure in the balancing chamber produced by the lost motion travel of the emergency piston.

2. The combination of a brake pipe; a quick service vent valve having a measuring chamber into which brake pipe air is discharged; and an emergency valve comprising a balancing chamber, a vent valve actuating piston mounted between said balancing chamber and the brake pipe, and a spring urging said piston toward said chamber, said piston being afforded a definite amount of lost motion from its normal running position before it opens the emergency vent valve, the volume of the quick service measuring chamber being so coordinated with the brake pipe volume and the displacement of the emergency piston in its lost motion travel being so coordinated with the balancing chamber volume, that the reduction of brake pipe pressure produced by equalization with the measuring chamber is substantially equal to the reduction of pressure in the balancing chamber produced by the lost motion travel of the emergency piston.

3. The combination of a brake pipe; a quick service vent valve comprising a measuring chamber and pressure actuated means responsive to a service reduction of brake pipe pressure to connect the brake pipe with said measuring chamber; and an emergency valve comprising a brake pipe vent valve; a balancing chamber charged from the brake pipe, and a vent valve actuating piston interposed between the brake pipe and said balancing chamber, said piston having a definite lost motion travel from its normal running position to the position at which it commences to open the emergency vent valve the volume of the quick service measuring chamber being so coordinated with brake pipe volume and the displacement of the emergency piston in its lost motion travel being so coordinated with the balancing chamber volume that the reduction of brake pipe pressure occasioned by connection with the measuring chamber approximates the reduction of balancing chamber pressure occasioned by the lost motion travel of the emergency piston.

4. The combination of a brake pipe; a quick service vent valve comprising a measuring chamber and pressure actuated means responsive to a service reduction of brake pipe pressure to connect the brake pipe with said measuring chamber; and an emergency valve comprising a brake pipe vent valve; a balancing chamber charged from the brake pipe, a vent valve actuating piston interposed between the brake pipe and said balancing chamber, and a spring urging said piston toward said balancing chamber, said piston having a definite lost motion travel from its normal running position to the position at which it commences to open the emergency vent valve, the volume of the quick service measuring chamber being so coordinated with brake pipe volume and the displacement of the emergency piston in its lost motion travel being so coordinated with the balancing chamber volume that the reduction of brake pipe pressure occasioned by connection with the measuring chamber approximates the reduction of balancing chamber pressure occasioned by the lost motion travel of the emergency piston.

5. The combination of a brake pipe; a quick service vent valve responsive to a service reduction of brake pipe pressure, and serving in response to such reduction to reduce brake pipe pressure a definite amount; an emergency vent valve; a balancing chamber; and a piston interposed between the brake pipe and said balancing chamber and having a running position and a service position to which it moves with definite lost motion, and from which further movement serves to open the emergency vent valve, the displacement of the emergency piston in its travel from running position to service position being so coordinated with the volume of the balancing chamber that balancing chamber pressure falls as a result of such travel of the piston in substantially the same degree that brake pipe pressure is reduced by said quick service vent valve.

6. The combination of a brake pipe; a quick service vent valve responsive to a service reduction of brake pipe pressure, and serving in response to such reduction to reduce brake pipe pressure a definite amount; an emergency vent valve; a balancing chamber; a piston interposed between the brake pipe and said balancing chamber, and having a running position in which it controls charging flow to the balancing chamber, and a service position to which it moves with definite lost motion and in which it vents the balancing chamber to the brake pipe at a service rate and from which further movement serves to open the emergency vent valve; and a spring urging said emergency piston toward its running position; the displacement of the emergency piston in its travel from running position to service position being so coordinated with the volume of the balancing chamber that balancing chamber pressure falls as a result of such travel of the piston in substantially the same degree that brake pipe pressure is reduced by said quick service vent valve.

7. The combination of claim 5, further characterized in that the quick service vent valve is of a type adapted to reduce the brake pipe pressure by substantially uniform amounts in each of a plurality of successive brake pipe reductions.

8. The combination of claim 3, further characterized in that the quick service vent valve is of the repeating type.

9. The combination of a brake pipe; a triple valve having a quick service position in which it reduces brake pipe pressure a definite amount by venting brake pipe air; and an emergency vent valve also connected to the brake pipe and comprising a vent controlling valve, a balancing chamber, and a piston interposed between the brake pipe and said balancing chamber and movable by preponderant balancing chamber pressure upon reduction of brake pipe pressure through a definite lost motion to a position from which further motion will open said valve, the volume of said balancing chamber being so coordinated with the displacement of the piston in its lost motion travel that such motion will reduce balancing chamber pressure substantially the amount that brake pipe pressure is reduced by quick service venting.

10. The combination of claim 9, further characterized in that the triple valve includes a measuring chamber into which air is vented in quick service.

11. The combination of claim 5, further characterized in that the quick service vent valve includes a measuring chamber in constant restricted communication with atmosphere.

12. The combination of a brake pipe; a triple valve having a quick service position in which it reduces brake pipe pressure a definite amount by venting brake pipe air; and an emergency vent valve also connected with the brake pipe and comprising a vent controlling valve, a balancing chamber, a piston interposed between the brake pipe and said balancing chamber and movable by preponderant balancing chamber pressure upon reduction of brake pipe pressure through a definite lost motion to a service position from which further motion will open said emergency vent valve, and means actuated by said piston for controlling the charging of said balancing chamber from the brake pipe, and the bleeding of said balancing chamber to the brake pipe in service position, the volume of said balancing chamber being so coordinated with the displacement of the piston in its lost motion travel, that such motion will reduce balancing chamber pressure substantially the amount that brake pipe pressure is reduced by quick service venting.

13. The combination of a brake pipe, a triple valve having a quick service position in which it reduces brake pipe pressure a definite amount by venting brake pipe air; an emergency vent valve also connected with the brake pipe and comprising a vent controlling valve; a balancing chamber; a piston interposed between the brake pipe and said balancing chamber and movable by preponderant balancing chamber pressure upon reduction of brake pipe pressure through a definite lost motion to a service position from which further motion will open said emergency vent valve; means actuated by said piston for controlling the charging of said balancing chamber from the brake pipe and the bleeding of said balancing chamber to the brake pipe in service position; and a spring urging said piston toward said balancing chamber, the volume of said balancing chamber being so coordinated with the displacement of the piston in its lost motion travel, that such motion will reduce balancing chamber pressure substantially the amount that brake pipe pressure is reduced by quick service venting.

14. The combination of claim 12, further characterized in that the triple valve includes a measuring chamber into which quick service air is vented in quick service.

15. The combination of a brake pipe in which a normal pressure is maintained under running conditions, and in which an excess releasing pressure is at times developed; a valve controlling venting flow from said brake pipe; a balancing chamber; a piston interposed between said balancing chamber and said brake pipe, and controlling the charging of the chamber from the brake pipe in running position and the bleeding of said chamber when brake pipe pressure is reduced at a slow rate, and serving to open said valve when brake pipe pressure is reduced at a relatively rapid rate; and a yielding stop serving normally to arrest said piston in running position but capable of yielding under said releasing pressure to permit the piston to move toward said chamber, the displacement of the piston in so moving, being so coordinated with the volume of said chamber and the normal and excess brake pipe pressures, that return of the piston by said stop to running position dissipates excess pressure in said chamber.

16. The combination of a brake pipe in which a normal pressure is maintained under running conditions, and which is subject to pressure increases for releasing brakes, and to definite quick service reductions; a valve controlling emergency venting flow from said brake pipe; a balancing chamber; and a piston interposed between said brake pipe and said chamber and controlling the charging and bleeding of the latter, said piston having a normal running position from which it moves idly toward said chamber to a release position, and from which it moves idly away from said chamber to a service position in which it is about to open said vent valve, the displacement of the piston in so moving being so coordinated with the volume of said chamber and the releasing increase and quick service reduction of brake pipe pressure, that excess chamber pressure is substantially dissipated by motion from release to running position, and chamber pressure falls to substantial equality with brake pipe pressure in quick service.

17. The combination of a brake pipe in which a normal pressure is maintained under running conditions, and which is subject to pressure increases for releasing brakes, and to definite quick service reductions; a valve controlling emergency venting flow from said brake pipe; a balancing chamber; a piston interposed between said brake pipe and said chamber, and controlling the charging and bleeding of the latter, said piston having a normal running position from which it moves idly toward said chamber to release position, and from which it moves idly away from said chamber to a service position in which it is about to open said vent valve, the displacement of the piston in so moving being so coordinated with the volume of said chamber and the releasing increase and quick service reduction of brake pipe pressure, that excess chamber pressure is substantially dissipated by motion from release to running position, and chamber pressure falls to substantial equality with brake pipe pressure in quick service; and a yielding stop for arresting said piston in running position but capable of yielding to permit it to move to release position.

18. The combination of a brake pipe in which a normal pressure is maintained under running conditions, and which is subject to pressure increases for releasing brakes, and to definite quick service reductions; a valve controlling emergency venting flow from said brake pipe; a balancing chamber; a piston interposed between said brake pipe and said chamber and controlling the charging and bleeding of the latter, said piston having a normal running position from which it moves idly toward said chamber to a release position, and from which it moves idly away from said chamber to a service position in which it is about to open said vent valve, the displacement of the piston in so moving being so coordinated with the volume of said chamber and the releasing increase and quick service reduction of brake pipe pressure, that excess chamber pressure is substantially dissipated by motion from release to running position, and chamber pressure falls to substantial equality with brake pipe pressure in quick service; and a spring urging said piston from service toward running position.

19. The combination of a brake pipe in which a normal pressure is maintained under running conditions, and which is subject to pressure increases for releasing brakes, and to definite quick service reductions; a valve controlling emergency venting flow from said brake pipe; a balancing chamber; a piston interposed between said brake pipe and said chamber and controlling the charging and bleeding of the latter, said piston having a normal running position from which it moves idly toward said chamber to a release position, and from which it moves idly away from said chamber to a service position in which it is about to open said vent valve, the displacement of the piston in so moving being so coordinated with the volume of said chamber and the releasing increase and quick service reduction of brake pipe pressure, that excess chamber pressure is substantially dissipated by motion from release to running position, and chamber pressure falls to substantial equality with brake pipe pressure in quick service; a spring urging said piston from service to running position; and a yielding stop for arresting said piston in running position but capable of yielding to permit it to move to release position.

20. The combination of a brake pipe; a vent valve; a balancing chamber; an abutment interposed between said brake pipe and balancing chamber, and shiftable upon reduction of brake pipe pressure to open said vent valve, said abutment controlling charging of the chamber from the brake pipe, and bleeding of said chamber upon moderate reductions of brake pipe pressure; a measuring chamber into which said vent valve discharges, said measuring chamber having a restricted bleed port for venting the same; and a bypass, between said balancing chamber and brake pipe, opened by said abutment in valve opening position, and providing a rate of reduction of balancing chamber pressure slower than the initial rate of brake pipe reduction through the vent valve and faster than the rate of brake pipe reduction through the restricted bleed port.

21. In an air brake system the combination of a normally charged brake pipe; a quick service venting mechanism operable in response to a slight reduction of brake pipe pressure to vent the brake pipe and produce a definite rapid additional reduction of brake pipe pressure; an emergency vent mechanism including a normally charged balancing chamber and brake pipe emergency venting means responsive to pressure differentials between the brake pipe and such balancing chamber, said emergency venting means having two ranges of action the first range being in response to a reduction not less than that produced by the functioning of the quick service venting mechanism irrespective of the rate at which such service reduction occurs, and ineffective to open the emergency vent, and the second range being responsive to a reduction of brake pipe pressure greater than that produced by quick service venting and effective to open the emergency vent.

22. In an air brake system, the combination of a normally charged brake pipe; a quick service venting mechanism operable in response to a slight reduction of brake pipe pressure to vent the brake pipe and produce a definite additional reduction of brake pipe pressure; an emergency vent mechanism including a normally charged balancing chamber and brake pipe venting means responsive to pressure differentials between the brake pipe and said balancing chamber, said actuating means having an idle travel from a normal running position when the brake pipe is charged, to a service position in which it is about to open the emergency vent; and means whereby such idle travel of said actuating means in response to the brake pipe pressure reduction produced by the quick service venting mechanism dissipates the actuating pressure differential between the balancing chamber and the brake pipe by increasing the effective volume of the balancing chamber.

CHARLES A. CAMPBELL.